US011959704B2

(12) United States Patent
Meyer

(10) Patent No.: US 11,959,704 B2
(45) Date of Patent: Apr. 16, 2024

(54) ROTARY TUBE KILN

(71) Applicant: ONEJOON GMBH, Bovenden (DE)

(72) Inventor: Wilhelm Meyer, Nideggen (DE)

(73) Assignee: ONEJOON GMBH, Bovenden (DE)

(*) Notice: Subject to any disclaimer, the term of this patent is extended or adjusted under 35 U.S.C. 154(b) by 198 days.

(21) Appl. No.: 17/416,068

(22) PCT Filed: Dec. 10, 2019

(86) PCT No.: PCT/EP2019/084503
§ 371 (c)(1),
(2) Date: Jun. 18, 2021

(87) PCT Pub. No.: WO2020/126699
PCT Pub. Date: Jun. 25, 2020

(65) Prior Publication Data
US 2022/0074664 A1 Mar. 10, 2022

(30) Foreign Application Priority Data
Dec. 21, 2018 (DE) ...................... 10 2018 133 566.0

(51) Int. Cl.
F27B 7/24 (2006.01)
F16J 15/34 (2006.01)
(Continued)

(52) U.S. Cl.
CPC ............ F27B 7/06 (2013.01); F16J 15/3436 (2013.01); F16J 15/4476 (2013.01); F27B 7/24 (2013.01);
(Continued)

(58) Field of Classification Search
CPC ........ F23G 2203/212; F27B 7/20; F27B 7/24; F27D 15/028; F16J 15/02; F16J 15/34
See application file for complete search history.

(56) References Cited

U.S. PATENT DOCUMENTS 4,193,756 A * 3/1980 Leon ................... F27B 7/24
277/389
4,199,154 A 4/1980 Mueller
(Continued)

FOREIGN PATENT DOCUMENTS

AT 397 861 B 7/1994
CA 1 326 357 C 1/1994
(Continued)

OTHER PUBLICATIONS

Office Action in related CN App. No. 201910371496.6 dated Aug. 28, 2023, 8 pages.

Primary Examiner — Gregory A Wilson
(74) Attorney, Agent, or Firm — SCHROEDER INTELLECTUAL PROPERTY LAW GROUP, LLC

(57) ABSTRACT

A rotary tube kiln, with a rotatably mounted rotary tube, which has a motorized drive, a mounting, a material inlet and a material outlet, wherein the interior space of the rotary tube has a process space, the inside atmosphere of which is separate from the outside atmosphere. The process space is sealed off from a pressure space by means of a first seal and the pressure space is sealed off from the outside atmosphere by means of a second seal and, by means of a pressing device, a first pressing force can be applied to the first seal and a second pressing force can be applied to the second seal, the first pressing force can be set independently of the second pressing force and, during operation, the internal pressure of the pressure space is higher than the internal pressure of the process space.

13 Claims, 6 Drawing Sheets

(51) Int. Cl.

| | |
|---|---|
| *F16J 15/447* | (2006.01) |
| *F27B 7/06* | (2006.01) |
| *F27B 7/42* | (2006.01) |
| *F27D 7/06* | (2006.01) |
| *F27D 21/00* | (2006.01) |

(52) U.S. Cl.
CPC ............... *F27B 7/42* (2013.01); *F27D 7/06* (2013.01); *F27D 21/00* (2013.01); *F27D 2007/063* (2013.01); *F27D 2021/0007* (2013.01)

(56) References Cited

U.S. PATENT DOCUMENTS

| | | | | |
|---|---|---|---|---|
| 4,295,824 | A | * 10/1981 | Wens | ............... F26B 15/04 |
| | | | | 432/115 |
| 5,022,852 | A | 6/1991 | Blasko et al. | |
| 5,106,105 | A | 4/1992 | Drexler | |
| 5,173,045 | A | * 12/1992 | Macri | ............... F23G 5/20 |
| | | | | 432/115 |
| 2004/0187750 | A1 | 9/2004 | Raichle et al. | |

FOREIGN PATENT DOCUMENTS

| | | | |
|---|---|---|---|
| CA | 2 456 230 C | 9/2011 | |
| CN | 103 603 955 | 2/2014 | |
| DE | 87 16 408 U1 | 4/1988 | |
| DE | 89 03 410 U1 | 1/1990 | |
| DE | 3744602 A1 * | 9/1998 | |
| DE | 203 02 000 U1 | 7/2004 | |
| GB | 2583748 B * | 8/2021 | ............... F16J 15/16 |
| JP | 2001-133157 A | 5/2001 | |
| JP | 2006-078149 | 3/2006 | |
| WO | WO-9714010 A1 * | 4/1997 | ............... F27B 7/08 |

\* cited by examiner

ROTARY TUBE KILN

RELATED APPLICATIONS

This application is a § 371 national phase of International Patent Application No. PCT/EP2019/084503 filed Dec. 10, 2019, which claims the filing benefit of German Patent Application No. 10 2018 133 566.0 filed Dec. 21, 2018, the contents of both of which are incorporated herein by reference.

BACKGROUND OF THE INVENTION

1. Field of the Invention

The invention relates to a rotary kiln, with a rotatably mounted kiln tube, which has a motor drive, a bearing, a material inlet and a material outlet, wherein the rotary kiln interior has a process chamber, the inner atmosphere of which is separated from the outer atmosphere,

2. Description of the Prior Art

Rotary kilns are used for continuous thermal treatment of bulk or piece goods. The physical or chemical processes involved may release gases and/or dust particles which should not leave the process chamber inside the rotary kiln in an uncontrolled manner. On the one hand, it may be desirable to feed the resulting gases/dust to further processing steps. On the other hand, the gases/dust may be harmful to the environment and must be disposed of in a controlled manner. Finally, vice versa, an entry of false air into the process chamber may also be undesirable or dangerous.

Seals for rotary kilns which provide a seal of the interior of the rotary kiln against the atmosphere are known. Known seals are configured, for example, as a sliding seal in which, in a simple configuration, part of the rotating kiln tube projects into a somewhat larger stationary tube. Between the two tubes, a sliding seal is attached to the larger tube and is in sliding contact with the larger stationary tube. Alternatively, a sealing ring may be connected to the stationary tube and may slide on the kiln tube.

It is disadvantageous in the above configurations that gas- and/or dust-tightness is difficult to achieve and maintain reliably for a long period. It is also difficult with these configurations to compensate for changes that occur during operation, such as a change in the length of the kiln tube due to temperature fluctuations, angular errors that develop during operation, or wear.

SUMMARY OF THE INVENTION

It is an object of the invention to provide a rotary kiln of the type mentioned at the beginning, the process chamber of which is reliably sealed from the outside atmosphere.

The object is achieved by a rotary kiln having the features of the independent claim. Further configurations of the invention are given in the dependent claims.

The rotary kiln according to the invention has a rotatably mounted kiln tube, which has a motor drive, a bearing, a material inlet and a material outlet. Depending on The rotary kiln interior forms a process chamber, the inner atmosphere of which is separated from the outer atmosphere.

According to the invention, the process chamber is sealed from a pressure chamber by means of a first seal and the pressure chamber is sealed from the outer atmosphere by means of a second seal. The first seal can be loaded, by means of a pressing device, with a first pressing force and the second seal can be loaded with a second pressing force. The first pressing force is adjustable independently of the second pressing force. The internal pressure of the pressure chamber is higher than the internal pressure of the process chamber during operation.

Thus, according to the invention, two seals are provided which are connected to each other via a pressure chamber and which can be loaded with pressing forces independently of each other. This allows the pressing forces to be set individually for each seal, so that any wear or other changes that occur can be adjusted individually for each seal and optimum sealing can thus be achieved at all times. At the same time, there is a pressurized pressure chamber located between the first seal, which provides a seal of the process chamber against the pressure chamber, and the second seal, which seals the pressure chamber against the outside atmosphere. Thus, if the first seal were to lose its sealing effect completely or partially, the contents of the pressure chamber would first enter the process chamber. If the pressure chamber is then filled with an appropriate gas which is harmless to the process chamber and the physical and/or chemical processes occurring therein, on the one hand, a negative influence on the process occurring in the process chamber and, on the other hand, an escape of gases and/or dusts into the atmosphere or the direct environment of the rotary kiln can be avoided.

In a further development, it is provided that the pressure chamber has a compensation element. For example, the compensation element may comprise a suitable gas-tight fabric or foil that has the required gas-tightness while being suitable for the conditions encountered during operation. Further, the compensation element may have suitable mechanical flexibility to comply with pressure and volume fluctuations. Also, the compensation element may be configured to comply with geometric changes. By means of such a compensation element, gas-tightness may thus be maintained even in the presence of spatial/geometric changes in the pressure chamber. This has the particular advantage that the pressing force to be exerted on the seals can be lower.

Advantageously, it may be provided that the pressure chamber is partially bounded by the compensation element. In this way, the compensation element may easily accommodate/compensate for volume changes in the pressure chamber or spatial/geometric changes in the pressure chamber boundaries.

Another advantage is that the pressure chamber may be dimensioned such that it is configured to receive dust particles such as seal abrasion or condensate and, for example, to store them temporarily until a maintenance interval.

It is particularly preferred if the compensation element connects the first seal and the second seal in a pressure-tight manner. Thus, if the position of the first seal changes relative to the second seal, the compensation element can accommodate this change in position. Even in the event of a change in the geometric extent of the first seal or/and the second seal, the compensation element can accommodate the resulting change in the pressure chamber.

In a specific configuration of the invention, it is provided that the first seal and the second seal differ from each other with respect to material, pressing pressure, adjustment range or/and geometric arrangement. In this way, the respective seal may be optimized with regard to its functionality. For example, the first seal, since it seals the pressure chamber against the process chamber, may be optimized more strongly with regard to thermal or/and chemical stress, while the second seal, which seals the pressure chamber against the outside atmosphere, may be optimized more strongly with regard to gas-tightness.

In a further embodiment of the invention, it is provided that the internal pressure of the pressure chamber is higher than the pressure of the external atmosphere. This represents a further safety measure, since in this way, even in the event of a complete or partial leakage of the second seal, the gas reaching the outside is usually the gas present in the pressure chamber. If this gas is selected accordingly, there is no danger to the outside atmosphere in such a case.

Specifically, in one embodiment, it is provided that the pressure chamber may be fillable with a sealing gas. On the one hand, the sealing gas may be selected such that no detrimental reaction may take place when the sealing gas enters the process chamber with a gas arranged there. Conversely, no such adverse reaction should be able to occur even if the process gas or gases enter the pressure chamber. On the other hand, the properties of the sealing gas may and should be such that no adverse effects would be expected if the sealing gas were to escape into the atmosphere.

Furthermore, the sealing gas may be selected such that if, contrary to expectations, the expected process gases should penetrate into the pressure chamber despite the actually higher pressure in the pressure chamber compared to the process chamber, a reaction with the sealing gas located there occurs which makes the penetration easy to detect. For example, the penetration could result in a color change, a pressure change, a conductivity change or similar. This can be detected and appropriate action can be taken.

In a further configuration of the invention, it is provided that the pressure in the pressure chamber or/and the first or/and the second pressing force is adjusted either continuously or as required by means of a control device. The pressure may, for example, be controlled and/or adjusted to a specific level via a pressure chamber line that is permanently connected to the pressure chamber or may be connected as required. In this context, the volume flow required to maintain a certain pressure, for example, may serve as a measure of the leak-tightness of the first and second seals. An individual change of the first or/and the second pressing force may be made, for example, in response to a certain operating duration and thus a certain assumed degree of wear. Alternatively or additionally, the adjustment may also be demand-controlled, for example in response to a determined leak-tightness of the respective seal.

In a specific embodiment of the invention, it is provided that the first seal with a first sealing surface and the second seal with a second sealing surface each bear against sliding surfaces which move along with the kiln tube. The pressure chamber is formed accordingly between the two sliding surfaces of the kiln tube. It is particularly preferred if, in this context, the compensation element connects the first seal and the second seal, in particular in a gas-tight manner. Since the compensation element may accommodate pressure or volume fluctuations of the pressure chamber, the pressing force, which connects the first sealing surface to the sliding surface and the second sealing surface to the sliding surface, need only be set such that the connection between the sealing surface and the sliding surface is gas-tight. There is no need to compensate for additional positional changes in the seals themselves. In particular, there is no need to guide the seals—such as sealing cords—in grooves and ensure gas-tightness between the sealing material itself and the inner wall of the groove. Particularly in the case of movements between the sealing material and an inner wall of a groove, gas-tightness can only be ensured by applying a high pressing force. This leads to high friction and the associated disadvantages such as high abrasion, high braking effect and high energy consumption.

Another advantage of a pressure chamber configured in this way is that, for example, an imbalance in the sliding surface or an oblique position of the sliding surface relative to the actual axis of rotation may be compensated for by means of the compensation element without any constructive changes.

Also, in the presence of a compensation element, the first or/and the second seal may be arranged and configured such that they each seal with only one sealing surface. This has the advantage that the friction between the seal and the sliding surface can be optimized and, in particular, is smaller than when the seal with several sealing surfaces bears against a sliding surface that moves with the kiln tube or a counter-sealing surface that is stationary relative to the kiln tube.

In this context, it may then also be provided that the pressing device is configured to independently exert the first and the second pressing forces which press the first and/or the second sealing surface against the sliding surfaces.

In a specific embodiment, it is provided that the pressing device is configured to exert the first or/and second pressing force by pre-tensioning of the first and/or the second seal, by a spring pre-tensioning of the first and/or the second seal, by weight loading to the first and/or the second seal, by pneumatic or/and hydraulic exertion of pressing force on the first and/or the second seal. Depending on further requirements which must be fulfilled for the entire rotary kiln and depending on the goods treated in the process chamber and the associated thermal, chemical, etc. loads, the appropriate force loading may thus be used.

As a further development of the invention, it may be provided that the first and/or the second seal has a labyrinth arrangement. By means of the labyrinth arrangement, in particular in the case of the first seal, which seals the pressure chamber against the process chamber, penetration of, for example, abrasion of the seal into the process chamber may be prevented.

In an advantageous further development of the invention, it is provided that parameters relevant for the leak-tightness of the first or/and the second seal, such as the pressure, the temperature and/or the sealing gas composition of the pressure chamber, are monitorable.

In particular, sensors may be provided for the pressure chamber to monitor the pressure, the temperature or/and the sealing gas composition. The sensors may be located in the pressure chamber itself or in a suitable operative connection with the pressure chamber. By means of the detection of the mentioned parameters, especially the leak-tightness or the conditions which have to prevail for a sufficient leak-tightness may be monitored and in reaction to the detected parameters an adjustment may be made at the pressing device concerning the first and/or the second pressing force. Alternatively or additionally, interventions may also be made in the control of the treatment process occurring in the process chamber, for example in response to a changed sealing gas composition or a temperature that is too high or too low.

BRIEF DESCRIPTION OF THE DRAWINGS

In the following, embodiments of the invention are explained in more detail with reference to the drawings.

DESCRIPTION OF PREFERRED EMBODIMENTS

Figure 1:
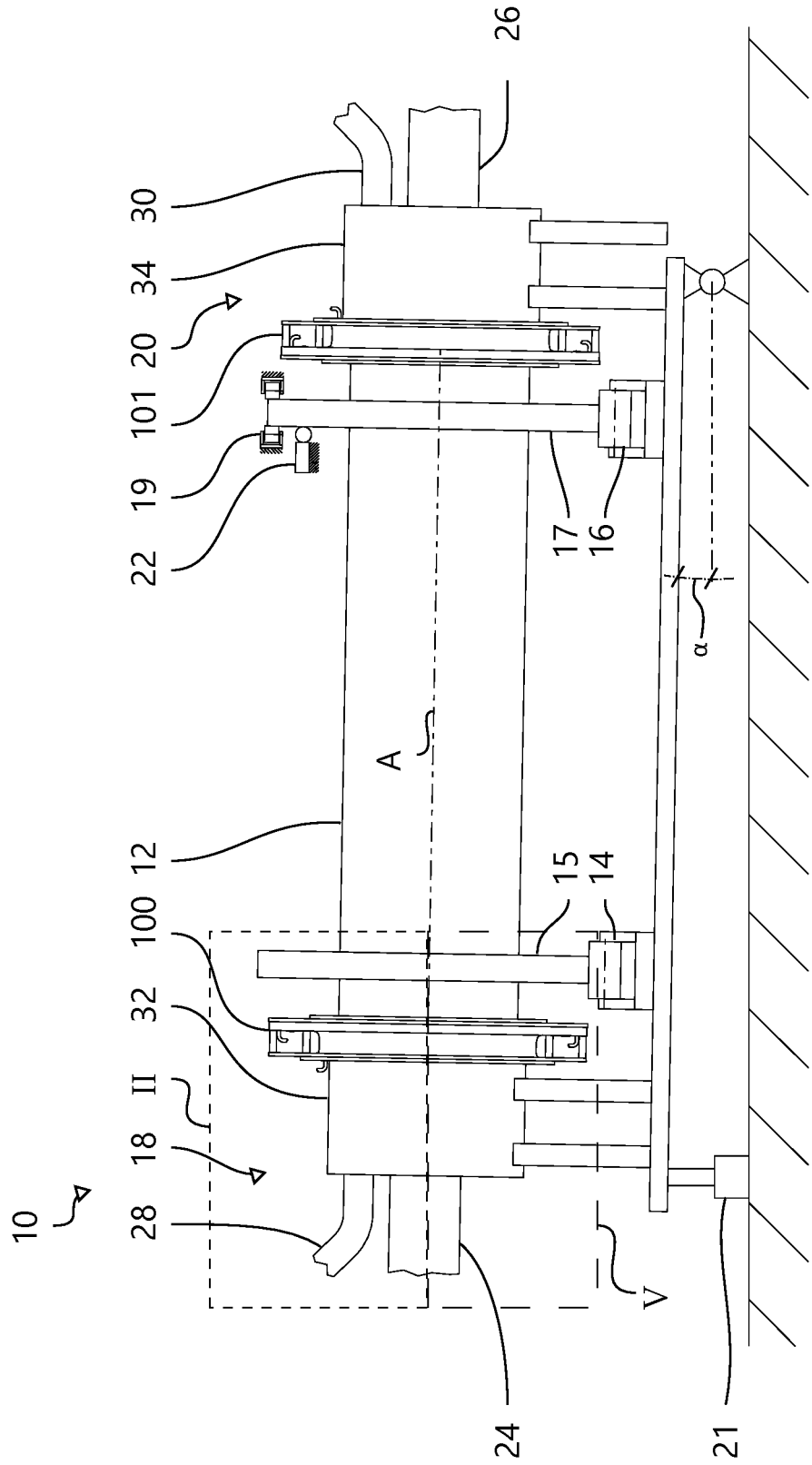
FIG. 1 shows a schematic side view of a first embodiment of a rotary kiln according to the invention.

FIG. 1 shows a schematic side view of a first embodiment of a rotary kiln 10 according to the invention. In the embodiment shown in FIG. 1, the rotary kiln 10 is configured for process chamber temperatures of up to 1200° C., for example, and has a kiln tube 12 which extends along an axis A and is rotatable about this axis A, wherein the kiln tube 12 may, in accordance with its intended use, be made of a heat-resistant steel, for example.

The axis A also indicates the direction along which the material to be treated travels through the kiln tube 12—in FIG. 1 from left to right. In the embodiment shown in FIG. 1, the kiln tube 12 is supported by bearings 14, 16 on the inlet side and on the outlet side. As is common in rotary kilns, one bearing is configured as a fixed bearing, i.e. no relative movement between the kiln tube 12 and the fixed bearing along the axis A is possible. The other bearing is configured as a floating bearing to allow linear expansion or contraction of the kiln tube 12 along axis A. In the example shown in FIG. 1, the bearing 14 on the inlet side forms the floating bearing and the bearing 16 on the outlet side forms the fixed bearing.

For supporting the kiln tube 12 by means of the bearings 14, 16, races 15, 17 are attached to the kiln tube 12, which run on the bearings 14, 16 and thus support the kiln tube 12. In the embodiment shown in FIG. 1, guides 19 for the fixed bearing 16

The longitudinal and rotational axis A of the kiln tube 12 is slanted relative to the horizontal by a tilt angle α in the embodiment shown in FIG. 1, so that the material moving in the kiln tube 12 moves from an inlet side 18 to an outlet side 20. The tilt angle α may be adjustable via a drive 21.

The kiln tube 12 is driven, and thus set in rotation, by means of a drive 22. In order to apply a corresponding drive torque to the kiln tube 12, a toothed ring and pinion combination or a chain or V-belt drive may be provided, for example, depending on the dimensions.

Multiple seals 100, 101 are provided on the inlet side 18 and on the outlet side 20 respectively, the configuration of which will be explained in more detail in the following figures. The multiple seals 100 seal the inside of the kiln tube 12 from the surroundings of the rotary kiln and, with a suitable arrangement of the sealing systems, may be used for all kiln tube materials and their fields of application. The portion around the respective multiple seal 100, together with the respective end of the kiln tube 12, forms the inlet head 32 or the outlet head 34, which are stationary relative to the rotating kiln tube 12.

A material inlet 24 is provided for feeding the material to be treated, and a material outlet 26 is provided for removing the treated material. An inlet 28 is provided at the inlet head 32 and an outlet 30 is provided at the outlet head 34 for process gases, wherein the assignment of inlet and outlet may be reversed depending on the configuration of the process occurring in the kiln tube 12. Furthermore, there may also be only an inlet or an outlet.

Figure 2:
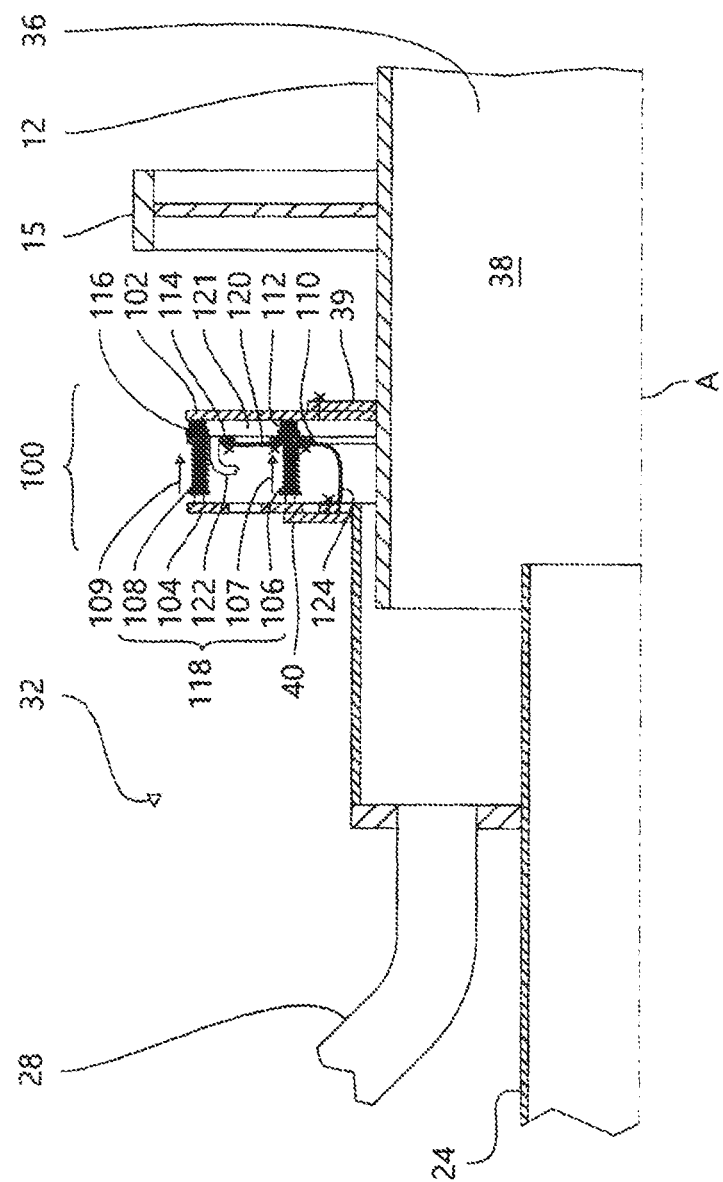
FIG. 2 shows a schematic partial sectional view of the inlet head area of the rotary kiln of FIG. 1.

FIG. 2 shows the section defined by dashed lines in FIG. 1 as a sectional view, the section cut being made along a vertical sectional plane along axis A. Features that have already been described with reference to FIG. 1 are given the same reference signs in FIG. 2, but are not described again in order to avoid unnecessary repetition.

As can be seen from FIG. 2, the kiln tube 12 encompasses a kiln tube interior 36 which serves as a process chamber 38 for the intended processes in the kiln tube 12.

The kiln tube 12 has a kiln tube flange 38 which is non-rotatably connected to the outer side, and the inlet head 32 has a head flange 40 which is non-rotatably connected to the inlet head 32. The multiple seal 100 is disposed between the two flanges 39, 40.

The multiple seal 100 has a sliding flange 102, which is fixedly connected to the kiln tube flange, and a pressing flange 104, which is fixedly connected to the head flange 40 and is thus stationary. Two spring systems 106, 108 are connected to the pressing flange 104, the two spring systems 106, 108 being arranged on different radii of the pressing flange 104. The spring systems 106, 108 are spaced at regular circumferential intervals along the pressing flange 104. The first inner spring system 106 is located on the smaller radius with respect to the axis of rotation A, and the second outer spring system 108 is located on the larger radius. The first spring system 106 is non-rotatably connected to a first seal 112 via a first inner pressing ring 110, and the second spring system 108 is non-rotatably connected to a second seal 116 via a second outer pressing ring 114.

The pressing flange 104, together with the spring systems 106, 108 and the pressing rings 110, 114, forms a pressing system 118.

The first and second spring systems 106, 108 each exert a spring or pressing force 107, 109—symbolized by arrows in FIG. 2—on the associated pressing ring 110, 114 and thus on the associated seal 112, 116 and presses them against the sliding flange 102.

Both spring systems 106, 108 operate independently of each other, i.e. the respective forces 107, 109 acting on the seals 112, 116 can be adjusted and changed independently of each other.

Between the inner seal 112 as well as the inner pressing ring 110, on the one hand, and the outer seal 116 as well as the outer pressing ring 114, on the other hand, a pressure chamber 121 is formed, which is bounded in the direction of the axis of rotation A by the sliding flange 102 and against the direction of the axis of rotation A by a first compensator 120. The first compensator 120 may be a suitable gas-tight fabric or foil element that has the required gas-tightness, is suitable for the conditions prevailing during operation such as, for example, temperature, pressure, chemical aggressiveness, etc., and at the same time has sufficient mechanical flexibility to be able to comply with the pressure and thus, if necessary, volume fluctuations that may occur. Examples are coated fabric structures, metal foils or the like.

The pressure chamber 121 thus created has in principle the shape of a hollow cylinder. The pressure chamber 121 may be maintained at a desired pressure with respect to the process chamber 38, on the one hand, and with respect to the external environment of the kiln tube 12, on the other hand. For this purpose, a gas connection 122 is provided which may be permanently or temporarily connected to a gas source (not shown). The gas which can be introduced into the pressure chamber 121 may, for example, be a sealing gas which can prevent process gases from escaping from the process chamber 38 into the environment of the kiln tube 12.

In order to create an overall gas-tight inlet head 32, in addition to the pressure chamber 121, a sealing of the process chamber 38 with respect to the pressing system 118 as such is to be provided. This is achieved in the embodiment shown in FIG. 2 by means of a second compensator 124. The second compensator 124 connects the inner pressing ring 110 to the pressing flange 104. Alternatively or additionally, a compensator element (not shown) could also connect the second outer pressing ring 114 to the pressing flange 104.

While the first compensator 120 has to compensate for a relative movement between the inner and outer pressing rings 110, 114, in addition to pressure-related volume fluctuations, the second compensator 124 primarily compensates for a relative movement between the pressing flange 104 and the sliding flange 102, which primarily results from temperature-related changes in length or position of the kiln tube 12.

Figure 3:
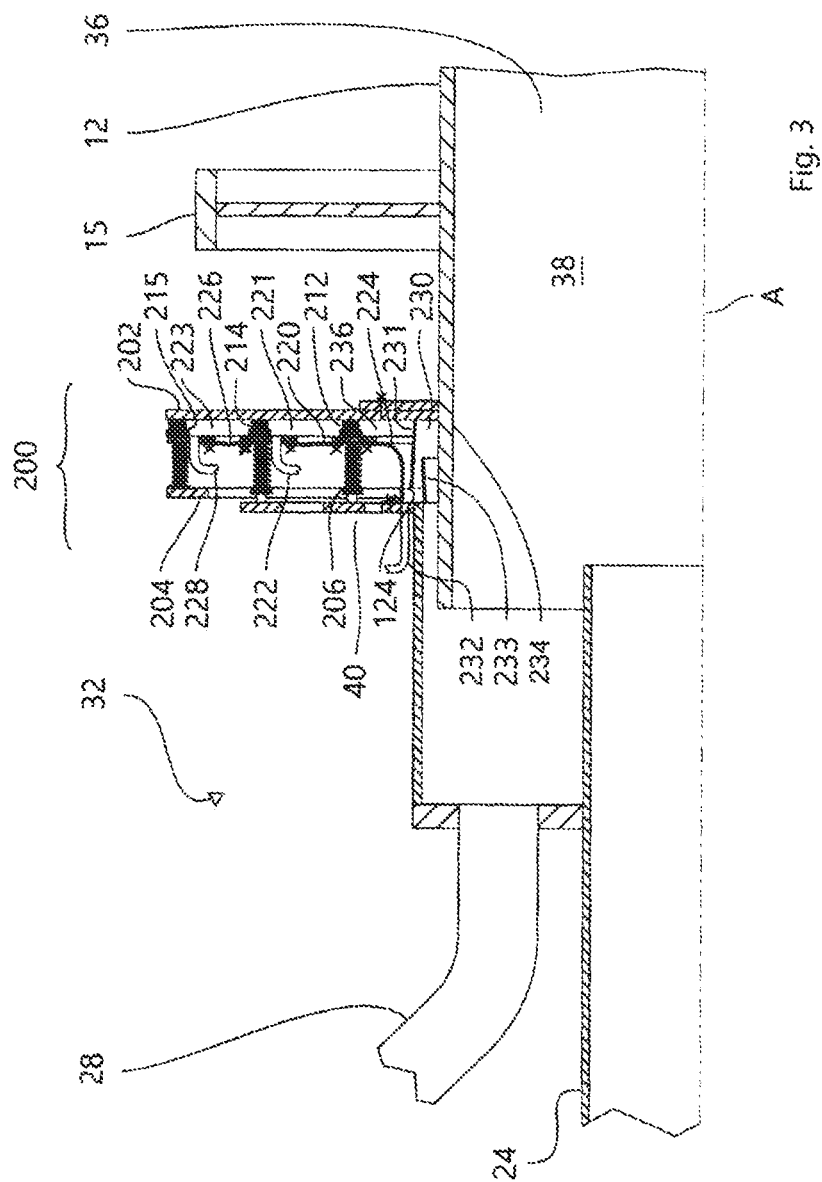
FIG. 3 shows a first alternative to the embodiment of FIG. 2.

FIG. 3 shows basically the same section and the same representation as FIG. 2. In contrast to the embodiment of FIG. 2, an alternatively constructed multiple seal 200 is shown. Identical or very similar features are indicated by reference signs to which 100 has been added. Such features are not explained again.

In contrast to the embodiment of FIG. 2, the multiple seal 200 has two pressure chambers 221, 223 arranged one behind the other in the radial direction. Both pressure chambers 221, 223 are bounded in the direction of the axial direction A by the same sliding flange 202. In the opposite direction, a third compensator 226 is provided next to the first compensator 220 (and the second compensator 224 opposite the process chamber 38).

A separate gas connection 222, 228 is provided for each of the two pressure chambers 221, 223, so that the two pressure chambers can be kept under pressure independently of each other. Corresponding to the two pressure chambers 221, 223, a further seal 215 is provided in addition to the two seals 212, 214 in order to close off the second pressure chamber 223 in the radial-outward direction.

A further difference is the labyrinth seal 230 present in the embodiment of FIG. 3, which may also be provided in the same form in the embodiment of FIG. 2. With a suitable configuration, the labyrinth seal 230 mainly prevents dust particles from the process chamber 38 from entering the multiple seal 200, on the one hand, and, if necessary, prevents undesired penetration of, for example, seal abrasion into the process chamber 38. In the labyrinth seal 230, a part 231—which is connected to the kiln tube 12 or the sliding flange 202 and thus rotates with the kiln tube 12 during operation—meshes with a part 233—which is attached to the inlet head 32 or the pressing flange 204 and is thus stationary.

In order to ensure a permanent sealing effect of the labyrinth seal 230, a flushing gas connection 232 is provided for flushing the flushing chamber 236 located between the outer kiln tube shell 234 and the second compensator 224 with a suitable flushing gas. In doing so, for example, any particles that may have entered the flushing chamber can be blown out through the labyrinth seal during suitable operating conditions of the rotary kiln, such as during maintenance. The flushing functionality may also be incorporated in the same form in the embodiment of FIG. 2.

Alternatively, the flushing chamber 236 could be filled with a sealing gas during regular (non-maintenance) operation, thereby improving the overall sealing effect of the multiple seal 200. During a maintenance cycle, on the other hand, the flushing chamber 236 may then again be flushed with a flushing gas.

Figure 4:
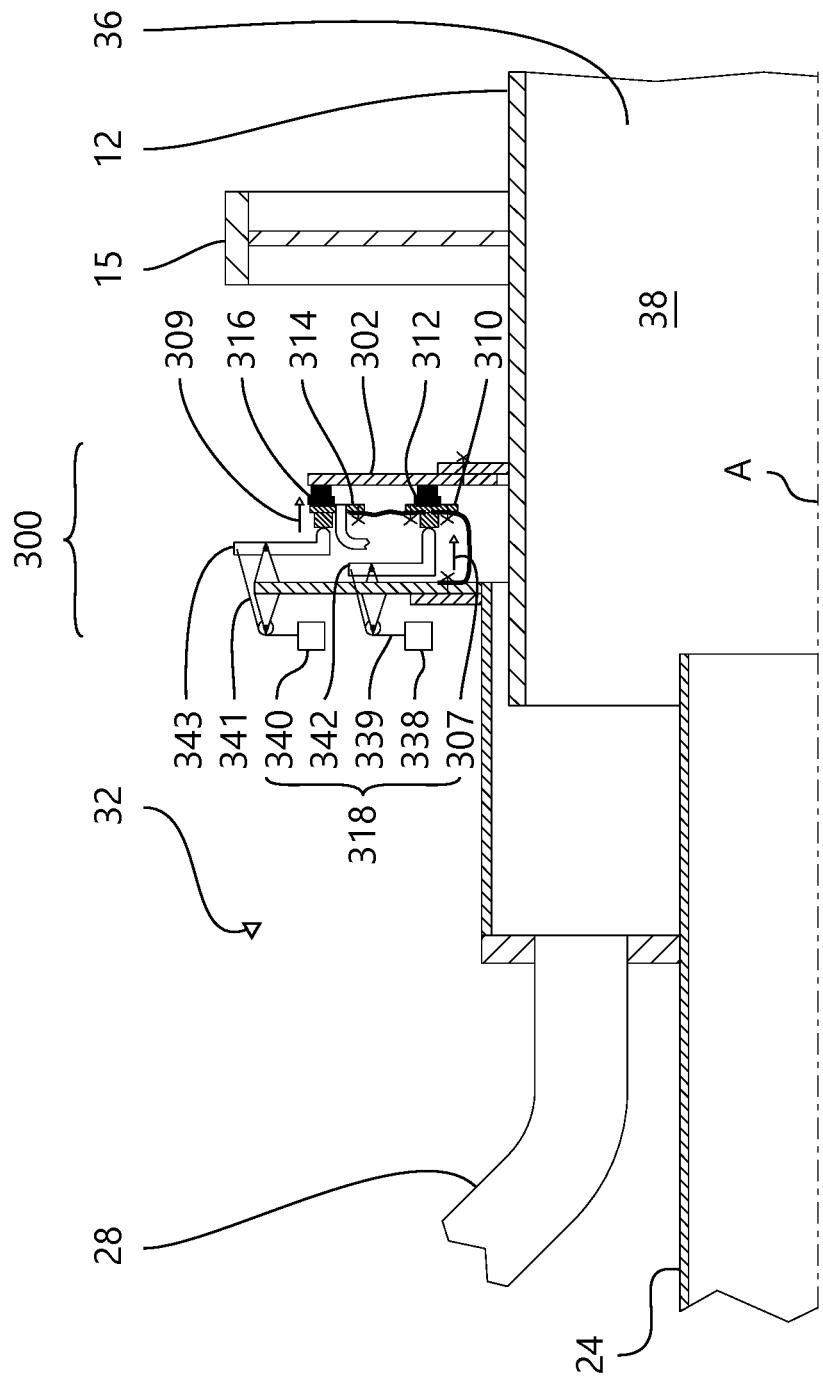
FIG. 4 shows a second alternative to the embodiment of FIG. 2.

FIG. 4 shows a second alternative to the embodiment of FIG. 2. FIG. 4 again shows the same section and embodiment as FIGS. 2 and 3. In contrast to the embodiment of FIG. 2 or 3, an alternatively constructed multiple seal 300 is shown. Identical or very similar features are indicated by reference numerals to which 100 has been added with respect to FIGS. 3 and 200 with respect to FIG. 2. Such features are not explained again.

In contrast to the embodiment of FIG. 2, the multiple seal 300 of FIG. 4 has an alternative pressing system 318. Instead of spring-loaded seals, the embodiment of FIG. 4 has seals 312, 316 on which a force 307, 309 is applied by means of a weight-loaded pressing mechanism such that the seals 312, 316 are pressed against the sliding flange 302. The pressing force 307, 309 is caused by weights 338, 340, which are transmitted to the pressing rings 310, 314 and thus ultimately to the seals 312, 316 by a cable pull system 339, 341 and corresponding levers 342, 343.

Figure 5:
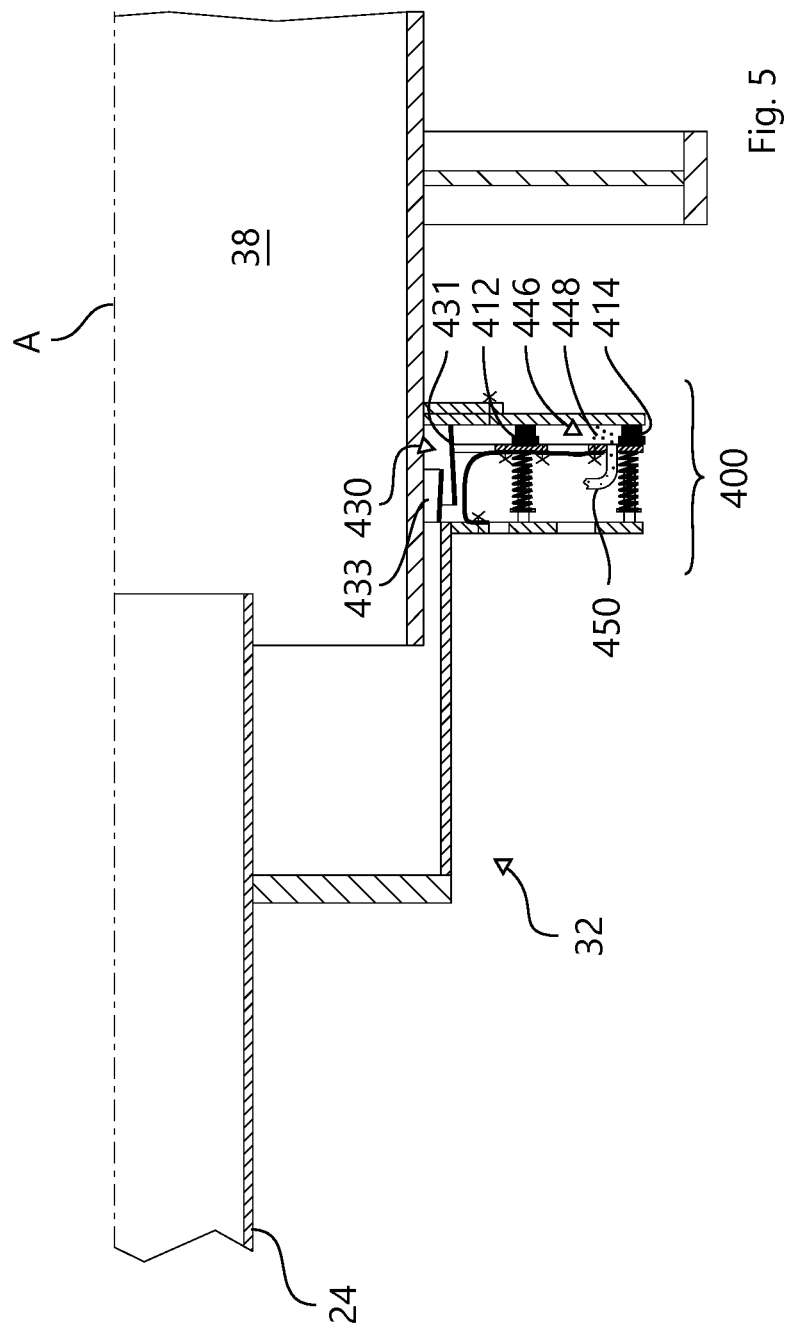
FIG. 5 shows another schematic partial sectional view of the inlet head area of the rotary kiln of FIG. 1.

In contrast to FIGS. 2-4, FIG. 5 also shows a sectional view in which the sectional cut is made along a vertical sectional plane along axis A, but FIG. 5 shows a different section. The section of FIG. 5 represents the area below axis A. In contrast to the embodiment of FIG. 2, an alternatively constructed multiple seal 400 is shown. Identical or very similar features are indicated by reference signs to which 300 has been added with respect to the representation in FIG. 2. Such features are not explained again.

In addition to the features already explained in FIGS. 2-4, in the embodiment of Figure a particle exhauster 446 is provided for particles 448 accumulating in the area of the multiple seal. The particles 448 may arise, for example, as a result of wear processes in the region of the seals 412, 414 and may be removed in a simple manner by means of an exhausting nozzle 450, for example, during maintenance or, with appropriate pressure control, even during ongoing operation of the rotary kiln 10. The arrangement of the particle exhauster 446 in the lower region of the kiln tube 12 is advantageous, since most of the abrasion particles accumulate there due to the force of gravity and the constant rotary motion.

Figure 6:
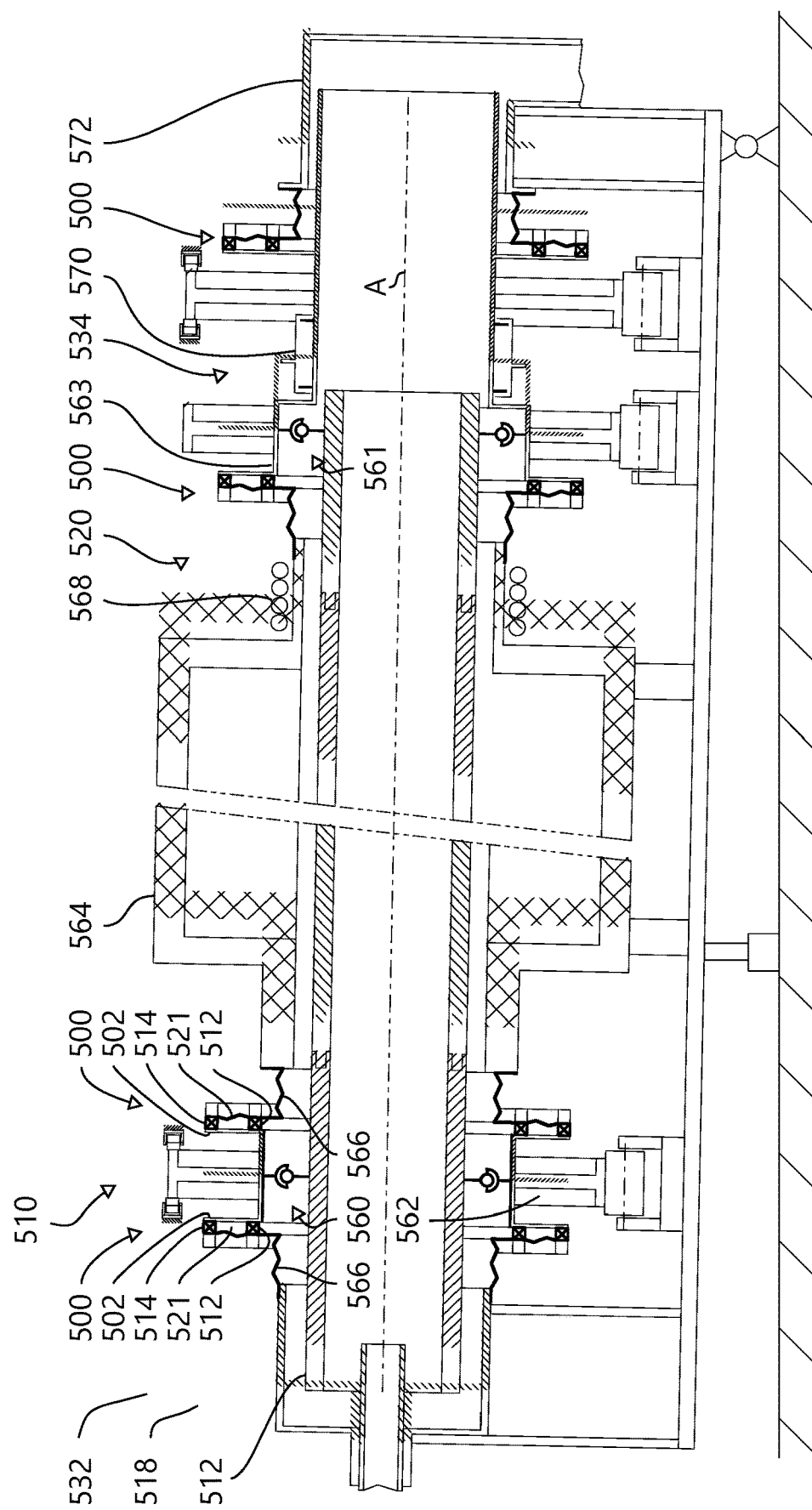
FIG. 6 shows a schematic sectional view of a second embodiment of a rotary kiln according to the invention.

FIG. 6 shows a schematic sectional view of a second embodiment of a rotary kiln 510 according to the invention. To avoid repetition, the entire structure of the rotary kiln 510 is not repeated in detail, but the differences from the structure of the rotary kiln of FIG. 1 are discussed in more detail.

The rotary kiln 510 of FIG. 6 is configured as a high-temperature version and has a metal-free kiln tube 512. The kiln tube 512 may preferably be made of graphite; alternatively, other materials such as ceramics or glass are also conceivable. Depending on the dimensions of the rotary kiln 510 and the choice of kiln tube material, the kiln tube 512 may be a single piece or composed of several individual elements.

The kiln tube 512 is supported at each of its two ends 518, 520 by a gimbal 560, 561. The gimbal 560 in turn is guided on the inlet side 518 within a drive ring 562. The drive ring 562 itself is sealed with respect to the stationary kiln head 532 and a kiln lid 564 encompassing the entire kiln tube 512, each by means of a multiple seal 500. The multiple seals 500 may have a structure according to the features of FIGS. 2-5, each individually or suitably combined. The kiln lid 564 may be provided with suitable insulation for high temperature applications.

In the inlet area of the inlet head 532, the drive ring 562 is provided with sliding flanges 502 against which seals 512, 514 bear. Pressure chambers 521 are formed between the seals 512, 514 using suitable compensators. A gas-tight connection of the seals to the stationary inlet head 532 or to the kiln lid 564 is also made in each case by means of compensators 566, so that a displacement or expansion of the kiln tube 512 is possible.

In the outlet area of the rotary kiln 510, water cooling initially occurs in the area of the kiln lid 564 by means of circulating lines 568. The lines 568 may be connected to a suitable coolant circuit and carry water in copper tubes as coolant, for example. The outlet head 534 may be provided with a further cooling zone 570, in which the treated material can be cooled down to the desired temperature, for example by means of air or also by means of water cooling. Again, multiple seals 500 may be used at suitable locations, such as at the transition from the kiln lid 564 to a drive ring 563 or at a transition from the drive ring 563 to a material discharge 572.

What is claimed is:

1. A rotary kiln comprising:
   a rotatably mounted kiln tube, which has a motor drive, a bearing, a material inlet and a material outlet, wherein a rotary kiln interior has a process chamber, an inner atmosphere of which is separated from an outer atmosphere;
   a first seal which seals the process chamber and inner atmosphere from a pressure chamber, and a second seal which seals the pressure chamber from the outer atmosphere, so that the first seal seals the inner atmosphere, the pressure chamber is sealed between the first seal and the second seal, and the second seal seals the pressure chamber from the outer atmosphere
   a pressing device which loads the first seal with a first pressing force, and the second seal with a second pressing force, such that the first pressing force is adjustable independently of the second pressing force, and
   a gas connection for generating an internal pressure in the pressure chamber, the internal pressure of the pressure chamber being higher than an internal pressure of the process chamber during operation.

2. The rotary kiln according to claim 1, wherein the pressure chamber has a compensation element, the compensation element partially sealing the pressure chamber from the inner atmosphere and the outer atmosphere.

3. The rotary kiln according to claim 2, wherein the pressure chamber is at least partially bounded by the compensation element.

4. The rotary kiln according to claim 2, wherein the compensation element connects the first seal and the second seal in a pressure-tight manner.

5. The rotary kiln according to claim 2, wherein the compensation element is mechanically flexible.

6. The rotary kiln according to claim 1, wherein the first seal and the second seal differ from each other with respect, to material, pressing pressure, adjustment range or/and geometric arrangement.

7. The rotary kiln according to claim 1, wherein the pressure chamber is tillable with a sealing gas.

8. The rotary kiln according to claim 1, wherein the pressure in the pressure chamber or/and the first or/and the second pressing force is adjustable either continuously or as required by means of a control device.

9. The rotary kiln according to claim 1, wherein the first seal with a first sealing surface and the second seal with a second sealing surface each hear against sliding surfaces which move along with the kiln tube.

10. The rotary kiln according to claim 9, wherein the pressing device is configured to independently exert the first and second pressing forces which press the first and/or second sealing surfaces against the sliding surfaces.

11. The rotary kiln according to claim 1, wherein the pressing device is configured to exert the first or/and second pressing force by an elastic pre-tensioning of the first and/or the second seal, by a spring pre-tensioning of the first and/or the second seal, a weight loading of the first and/or the second seal, by a pneumatic or/and hydraulic exertion of pressing force on the first and/or the second seal.

12. The rotary kiln according to claim 1, wherein the first or/and the second seal has a labyrinth arrangement.

13. The rotary kiln according to claim 1, wherein the pressure, the temperature and/or the sealing gas composition of the pressure chamber are monitorable.

* * * * *

UNITED STATES PATENT AND TRADEMARK OFFICE
CERTIFICATE OF CORRECTION

| | |
|---|---|
| PATENT NO. | : 11,959,704 B2 |
| APPLICATION NO. | : 17/416068 |
| DATED | : April 16, 2024 |
| INVENTOR(S) | : Wilhelm Meyer |

It is certified that error appears in the above-identified patent and that said Letters Patent is hereby corrected as shown below:

In the Claims

Column 10, Line 19     Delete "tillable" and insert -- fillable --

Column 10, Line 26     Delete "hear" and insert -- bear --

Signed and Sealed this
Second Day of July, 2024

*Katherine Kelly Vidal*

Katherine Kelly Vidal
*Director of the United States Patent and Trademark Office*